United States Patent
Lee et al.

(10) Patent No.: US 12,114,345 B2
(45) Date of Patent: Oct. 8, 2024

(54) METHOD AND APPARATUS FOR HANDLING BWP SWITCHING BASED ON PRIORITY IN A WIRELESS COMMUNICATION SYSTEM

(71) Applicant: LG ELECTRONICS INC., Seoul (KR)

(72) Inventors: Youngdae Lee, Seoul (KR); Giwon Park, Seoul (KR); Hanbyul Seo, Seoul (KR); Jongyoul Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 334 days.

(21) Appl. No.: 17/753,010

(22) PCT Filed: Oct. 8, 2020

(86) PCT No.: PCT/KR2020/013712
§ 371 (c)(1),
(2) Date: Feb. 15, 2022

(87) PCT Pub. No.: WO2021/071268
PCT Pub. Date: Apr. 15, 2021

(65) Prior Publication Data
US 2022/0279527 A1  Sep. 1, 2022

(30) Foreign Application Priority Data
Oct. 10, 2019  (KR) .................. 10-2019-0125580

(51) Int. Cl.
*H04W 72/10*  (2009.01)
*H04W 72/04*  (2023.01)
(Continued)

(52) U.S. Cl.
CPC ......... *H04W 72/56* (2023.01); *H04W 72/044* (2013.01); *H04W 72/23* (2023.01); *H04W 92/18* (2013.01)

(58) Field of Classification Search
CPC ... H04W 72/56; H04W 72/044; H04W 72/23; H04W 72/0453; H04W 92/18
(Continued)

(56) References Cited

U.S. PATENT DOCUMENTS

2019/0149305 A1  5/2019  Zhou et al.
2019/0166529 A1  5/2019  Chen et al.
(Continued)

OTHER PUBLICATIONS

PCT International Application No. PCT/KR2020/013712, International Search Report dated Jan. 28, 2021, 2 pages.
(Continued)

*Primary Examiner* — Candal Elpenord
(74) *Attorney, Agent, or Firm* — LEE, HONG, DEGERMAN, KANG & WAIMEY

(57) ABSTRACT

A method and apparatus for handling BWP switching based on priority in a wireless communication system is provided. A wireless device receives configuration of multiple bandwidth parts (BWPs) on a cell, wherein the multiple BWPs includes at least one active uplink (UL) BWP for UL transmission and at least one active sidelink (SL) BWP for SL transmission. A wireless device detects a triggering condition for switching to a specific UL BWP which cannot be simultaneously active with the active SL BWP. A wireless device determines whether to switch to the specific UL BWP based on priority information, wherein the priority information includes at least one of UL priority and/or SL priority. A wireless device performs the switching to the specific UL BWP based on the determination.

9 Claims, 14 Drawing Sheets

(51) Int. Cl.
*H04W 72/044* (2023.01)
*H04W 72/23* (2023.01)
*H04W 72/56* (2023.01)
*H04W 92/18* (2009.01)

(58) Field of Classification Search
USPC .................................................. 370/329–330
See application file for complete search history.

(56) References Cited

U.S. PATENT DOCUMENTS

| | | | |
|---|---|---|---|
| 2019/0182870 A1 | 6/2019 | Shih et al. | |
| 2020/0259627 A1* | 8/2020 | Loehr | H04W 72/23 |
| 2020/0351067 A1* | 11/2020 | Hui | H04L 5/001 |
| 2021/0045100 A1* | 2/2021 | Park | H04W 72/21 |
| 2021/0091912 A1* | 3/2021 | Tang | H04L 5/0094 |
| 2021/0306824 A1* | 9/2021 | Li | H04W 4/40 |
| 2022/0046698 A1* | 2/2022 | Zhao | H04W 72/1268 |
| 2022/0174774 A1* | 6/2022 | Tseng | H04W 76/23 |
| 2022/0201716 A1* | 6/2022 | Yi | H04W 72/0453 |

OTHER PUBLICATIONS

Huawei et al., "Sidelink physical layer structure for NR V2X," R1-1906007, 3GPP TSG RAN WG1 Meeting #97, May 2019, 20 pages.

LG Electronics, "Discussion on NR sidelink resource allocation for Mode 1," R1-1910778, 3GPP TSG RAN WG1 #98bis Meeting, Oct. 2019, 13 pages.

3rd Generation Partnership Project, "Technical Specification Group Radio Access Network; NR; Physical channels and modulation (Release 15)," 3GPP TS 38.211 V15.6.0, Jun. 2019, 97 pages.

3rd Generation Partnership Project, "Technical Specification Group Radio Access Network; NR; Physical layer procedures for control (Release 15)," 3GPP TS 38.213 V15.6.0, Jun. 2019, 107 pages.

* cited by examiner

METHOD AND APPARATUS FOR HANDLING BWP SWITCHING BASED ON PRIORITY IN A WIRELESS COMMUNICATION SYSTEM

CROSS-REFERENCE TO RELATED APPLICATIONS

This application is the National Stage filing under 35 U.S.C. 371 of International Application No. PCT/KR2020/013712, filed on Oct. 8, 2020, which claims the benefit of earlier filing date and right of priority to Korean Application No. 10-2019-0125580 filed on Oct. 10, 2019, the contents of which are hereby incorporated by reference herein in their entireties.

BACKGROUND

Technical Field

The present disclosure relates to a method and apparatus for handling BWP switching based on priority in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Vehicle-to-everything (V2X) communication is the passing of information from a vehicle to any entity that may affect the vehicle, and vice versa. It is a vehicular communication system that incorporates other more specific types of communication as vehicle-to-infrastructure (V2I), vehicle-to-network (V2N), vehicle-to-vehicle (V2V), vehicle-to-pedestrian (V2P), vehicle-to-device (V2D) and vehicle-to-grid (V2G).

SUMMARY

Technical Objects

A wireless device could configure multiple bandwidth parts (BWPs). A wireless could configure multiple uplink (UL) BWPs for UL transmission. A wireless device could configure at least one sidelink BWP for sidelink (SL) transmission.

At least one BWP among the multiple UL BWPs could be active. Other UL BWPs except the at least one active UL BWP would be inactive. In addition, at least one SL BWP could be active and other SL BWPs would be inactive.

The BWP switching may be used to activate an inactive BWP and deactivate an active BWP at a time. For example, a wireless device could perform UL BWP switching to activate an inactive UL BWP and deactivate an active SL BWP. For example, a wireless device could perform SL BWP switching to activate an inactive SL BWP and deactivate an active SL BWP.

However, a wireless device could not always use the active UL BWP and the active SL BWP simultaneously. For example, if the numerology of the active UL BWP is different than the numerology of the active SL BWP, a wireless device could not perform both UL transmission and SL transmission simultaneously.

It may happen that the wireless device could not use the both the activated UL BWP and the activated SL BWP, after performing a BWP switching.

Thus, studies for handling BWP switching based on priority in a wireless communication system are required.

Technical Solutions

In an aspect, a method performed by a wireless device in a wireless communication system is provided. A wireless device receives configuration of multiple bandwidth parts (BWPs) on a cell, wherein the multiple BWPs includes at least one active uplink (UL) BWP for UL transmission and at least one active sidelink (SL) BWP for SL transmission. A wireless device detects a triggering condition for switching to a specific UL BWP which cannot be simultaneously active with the active SL BWP. A wireless device determines whether to switch to the specific UL BWP based on priority information, wherein the priority information includes at least one of UL priority and/or SL priority. A wireless device performs the switching to the specific UL BWP based on the determination.

In another aspect, an apparatus for implementing the above method is provided.

Technical Effects

The present disclosure can have various advantageous effects.

According to some embodiments of the present disclosure, a wireless device could handle BWP switching efficiently in a wireless communication system.

For example, a wireless device could perform BWP switching by considering both UL transmission and SL transmissions.

For example, a wireless communication system could provide proper BWP switching based on a priority for a wireless device performing SL transmission.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various

DETAILED DESCRIPTION

Figure 1:
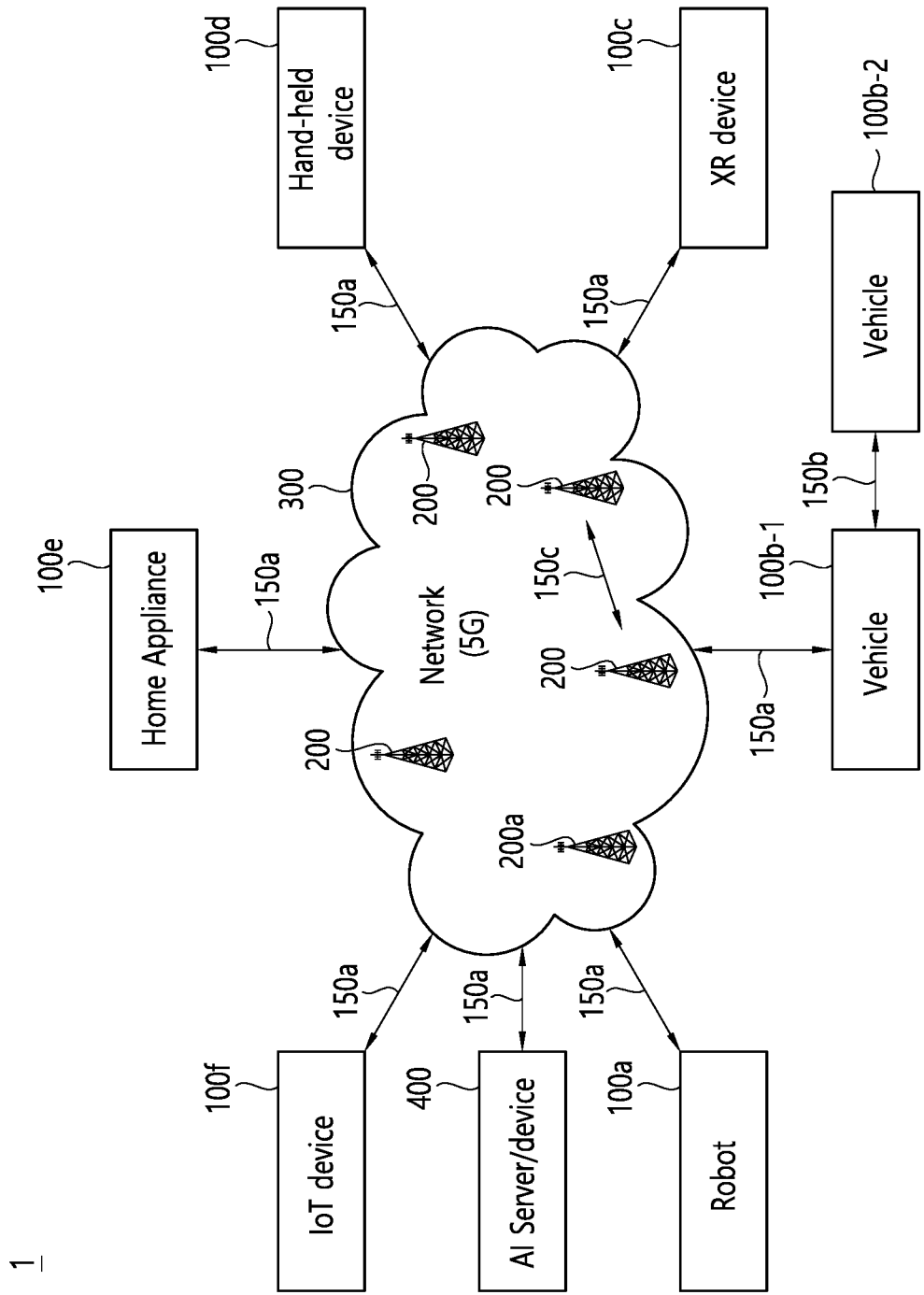
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructable wireless links is an attractive opportunity in many industrial fields. However, in order to achieve this replacement, it is necessary for wireless connection to be established with latency, reliability, and capacity similar to those of the cable and management of wireless connection needs to be simplified.

Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
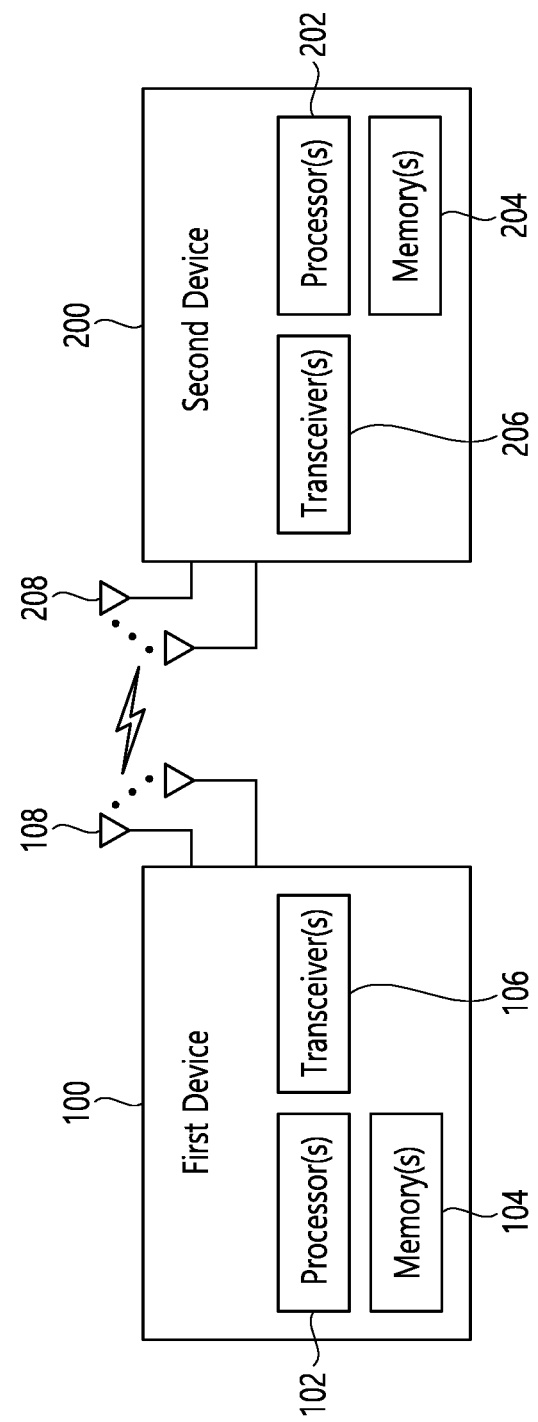
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
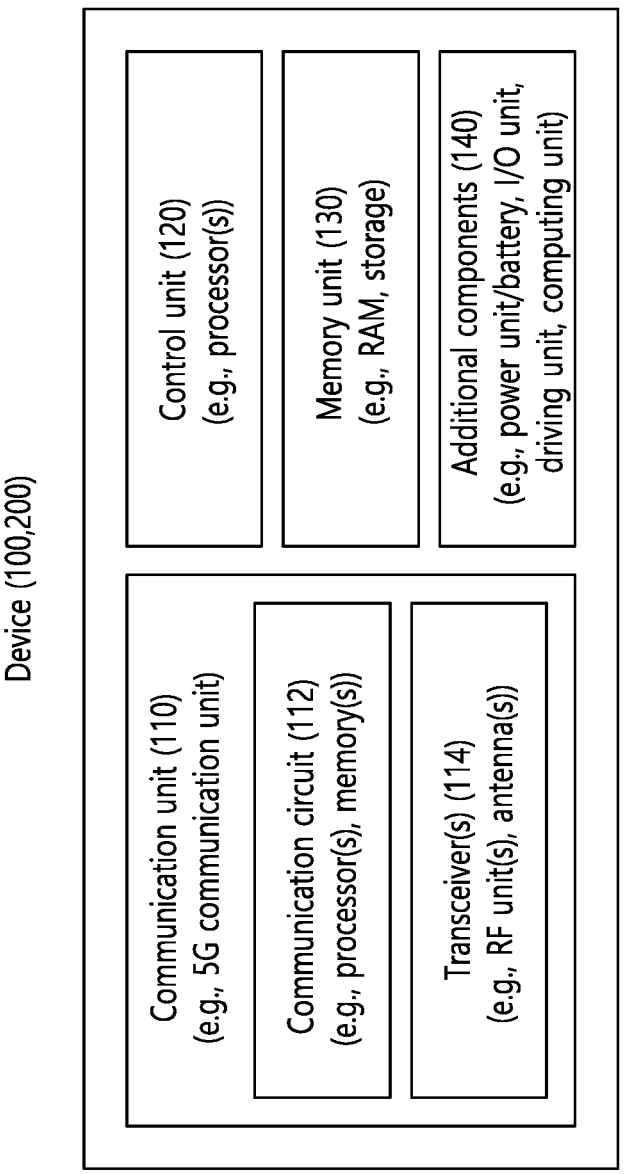
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
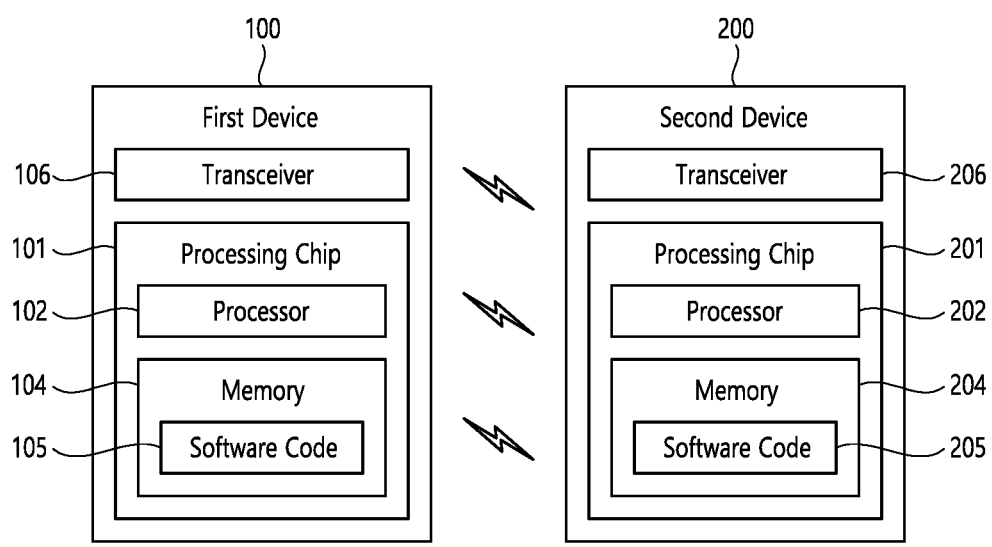
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
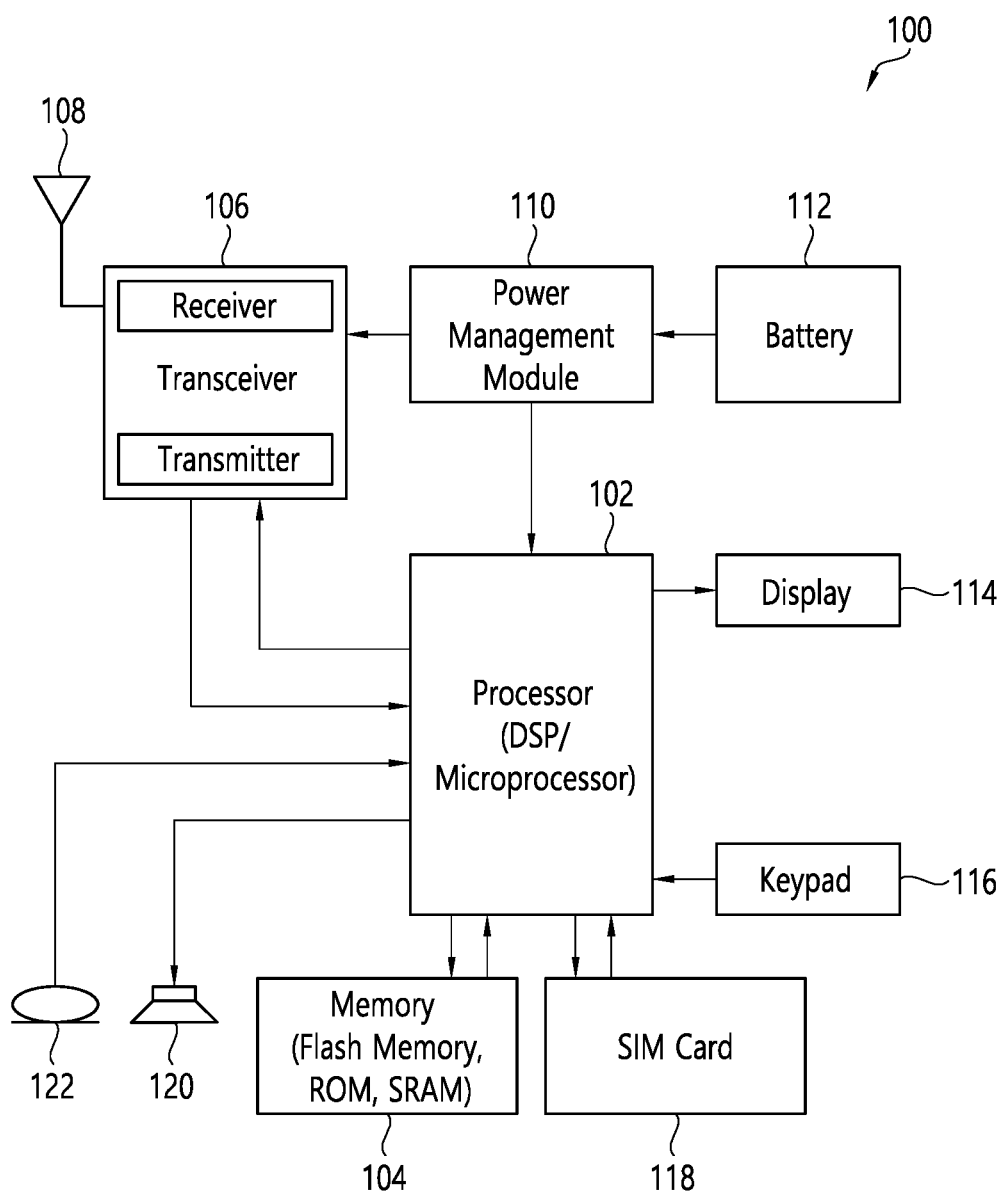
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
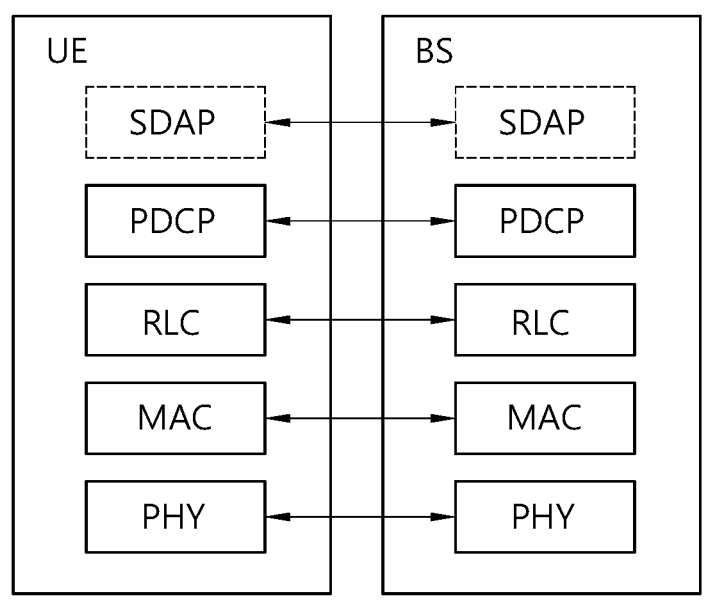
FIGS. 6 and 7 show an example of protocol stacks in a 3GPP based wireless communication system to which implementations of the present disclosure is applied.
Figure 7:
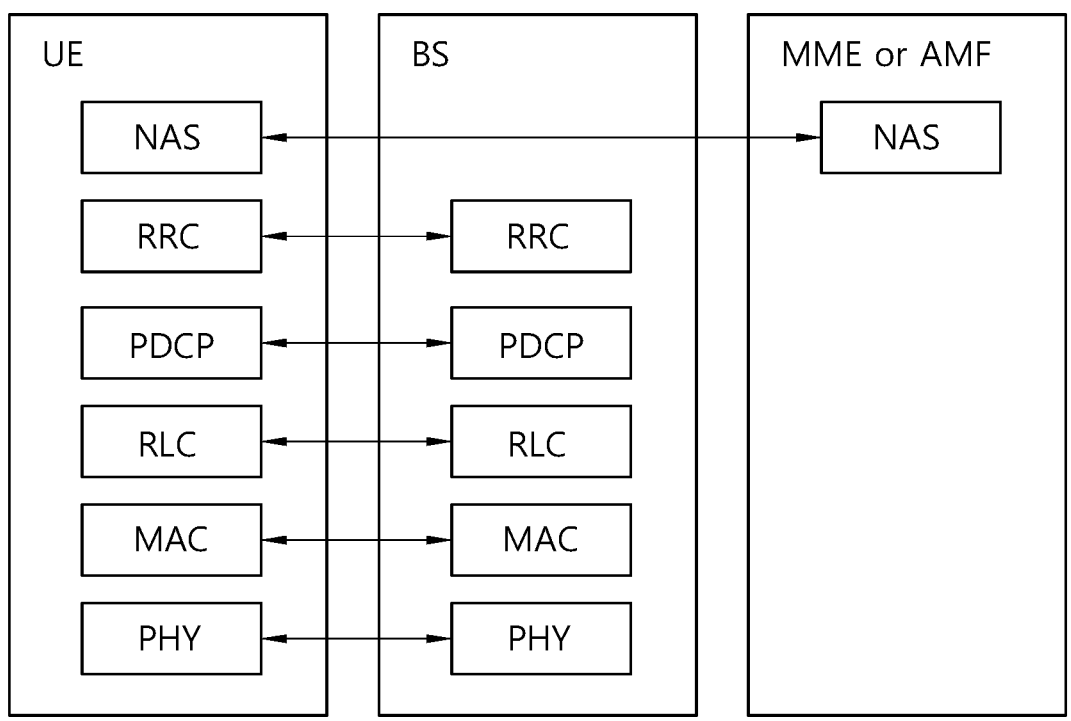

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
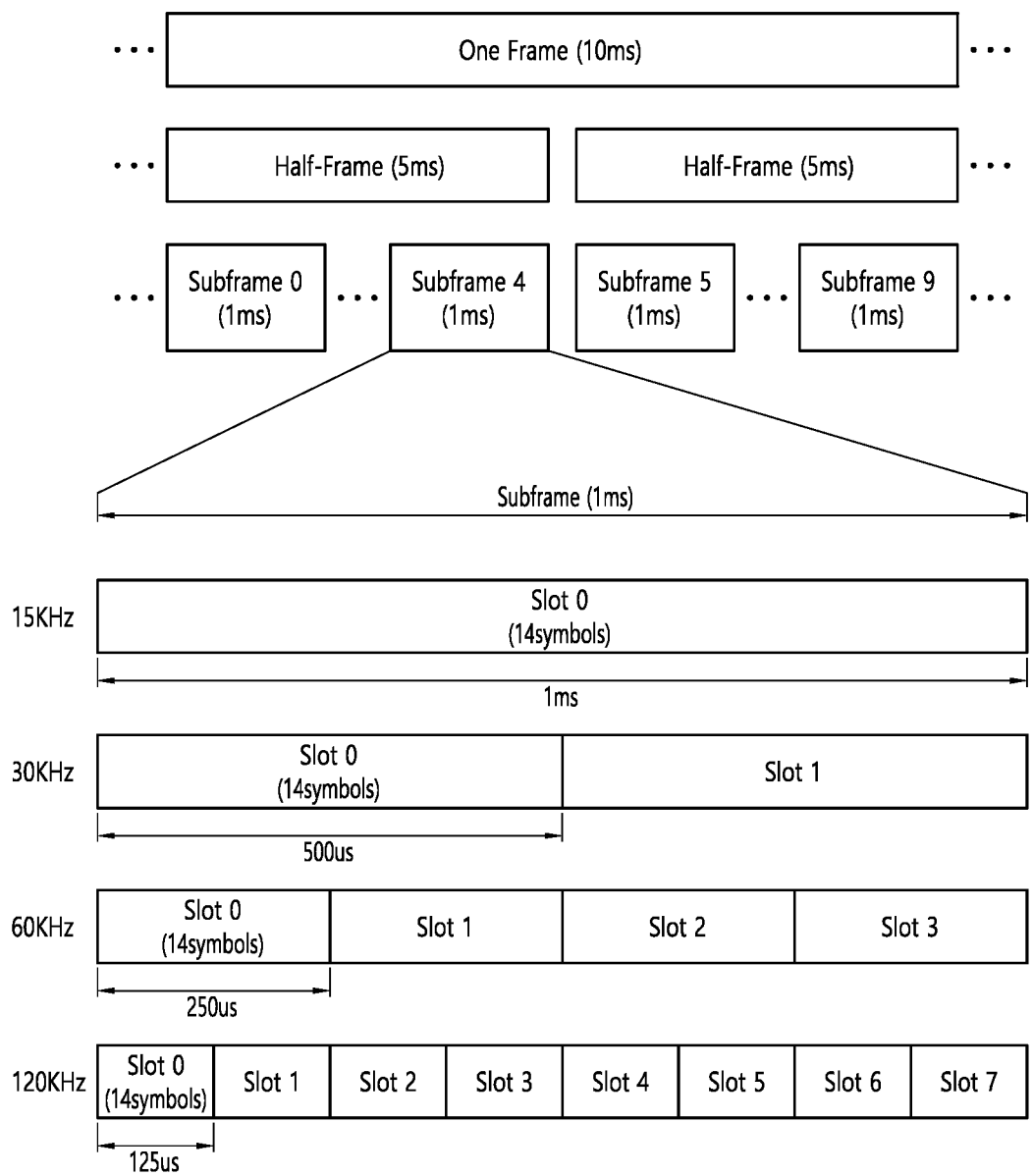
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f=10$ ms duration. Each frame is divided into two half-frames, where each of the half-frames has 5 ms duration. Each half-frame consists of 5 subframes, where the duration $T_s f$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2^u*15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f=2^u*15$ kHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f=2^u*15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x}*N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index/representing a symbol location relative to a reference point in the time domain. In the 3GPP based wireless communication system, an RB is defined by 12 consecutive subcarriers in the frequency domain. In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times. In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
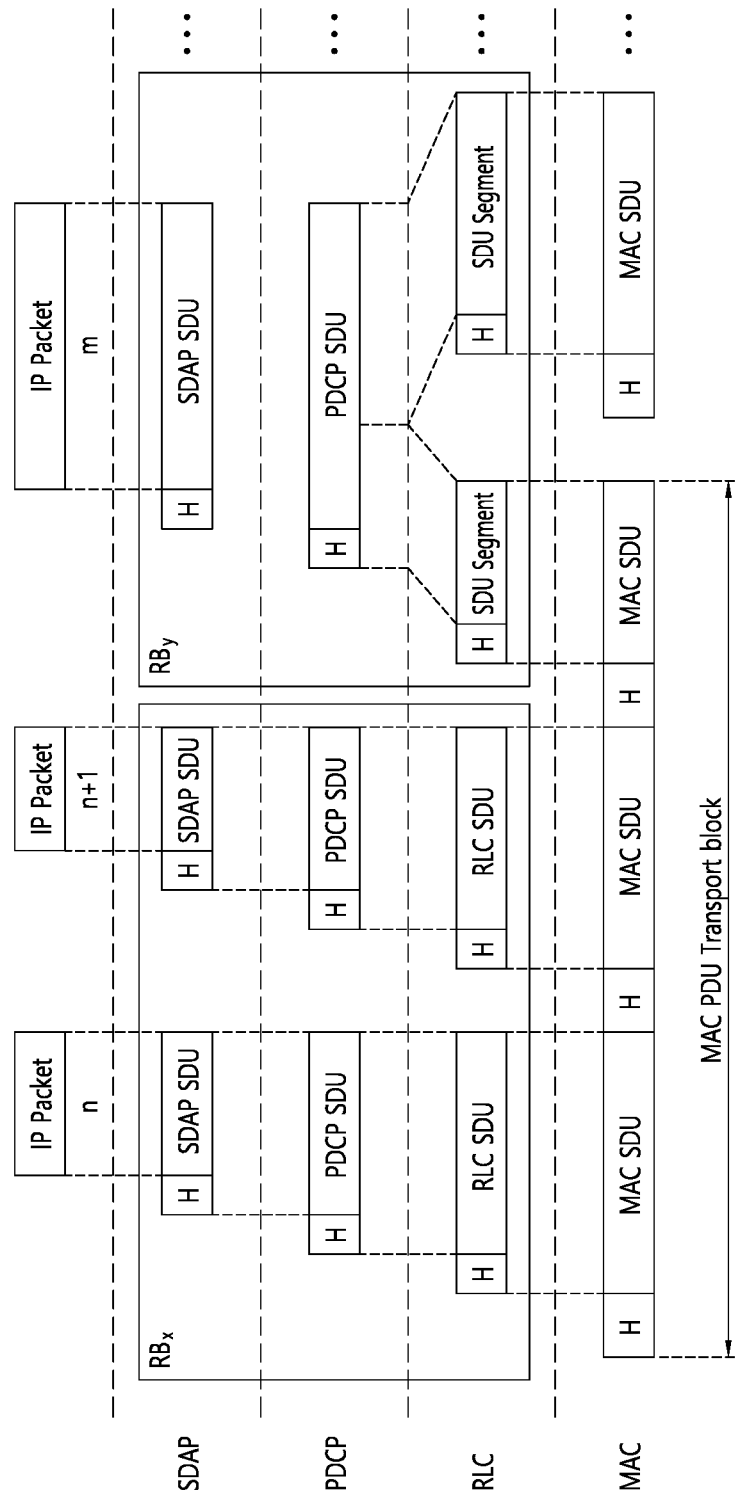
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Support for vehicle-to-vehicle (V2V) and vehicle-to-everything (V2X) services has been introduced in LTE during Releases 14 and 15, in order to expand the 3GPP platform to the automotive industry. These work items defined an LTE sidelink suitable for vehicular applications, and complementary enhancements to the cellular infrastructure.

Further to this work, requirements for support of enhanced V2X use cases have been defined in 5G LTE/NR, which are broadly arranged into four use case groups:

1) Vehicles platooning enables the vehicles to dynamically form a platoon travelling together. All the vehicles in the platoon obtain information from the leading vehicle to manage this platoon. These information allow the vehicles to drive closer than normal in a coordinated manner, going to the same direction and travelling together.
2) Extended Sensors enables the exchange of raw or processed data gathered through local sensors or live video images among vehicles, road site units, devices of pedestrian and V2X application servers. The vehicles can increase the perception of their environment beyond of what their own sensors can detect and have a more broad and holistic view of the local situation. High data rate is one of the key characteristics.

3) Advanced driving enables semi-automated or full-automated driving. Each vehicle and/or RSU shares its own perception data obtained from its local sensors with vehicles in proximity and that allows vehicles to synchronize and coordinate their trajectories or maneuvers. Each vehicle shares its driving intention with vehicles in proximity too.

4) Remote driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

NR sidelink (SL) unicast, groupcast, and broadcast design is described. SL broadcast, groupcast, and unicast transmissions are supported for the in-coverage, out-of-coverage and partial-coverage scenarios.

Figure 10:
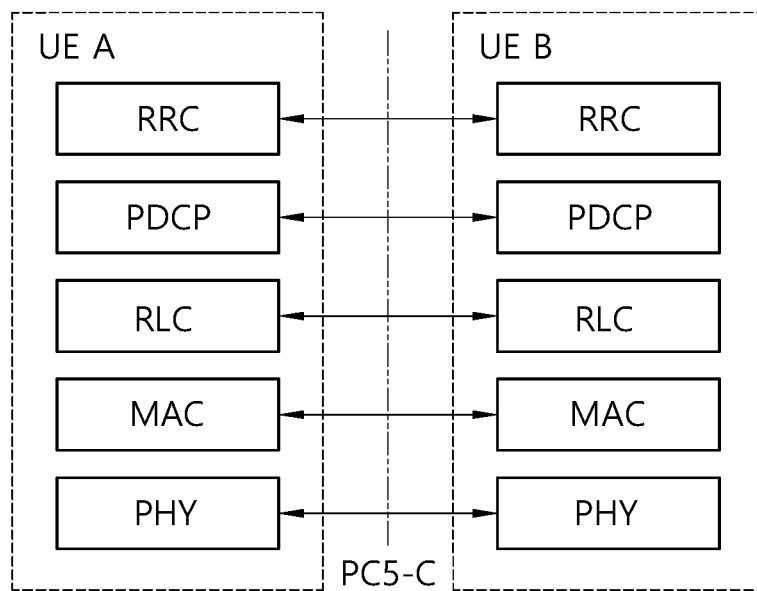
FIGS. 10 and 11 show an example of PC5 protocol stacks to which implementations of the present disclosure is applied.
Figure 11:
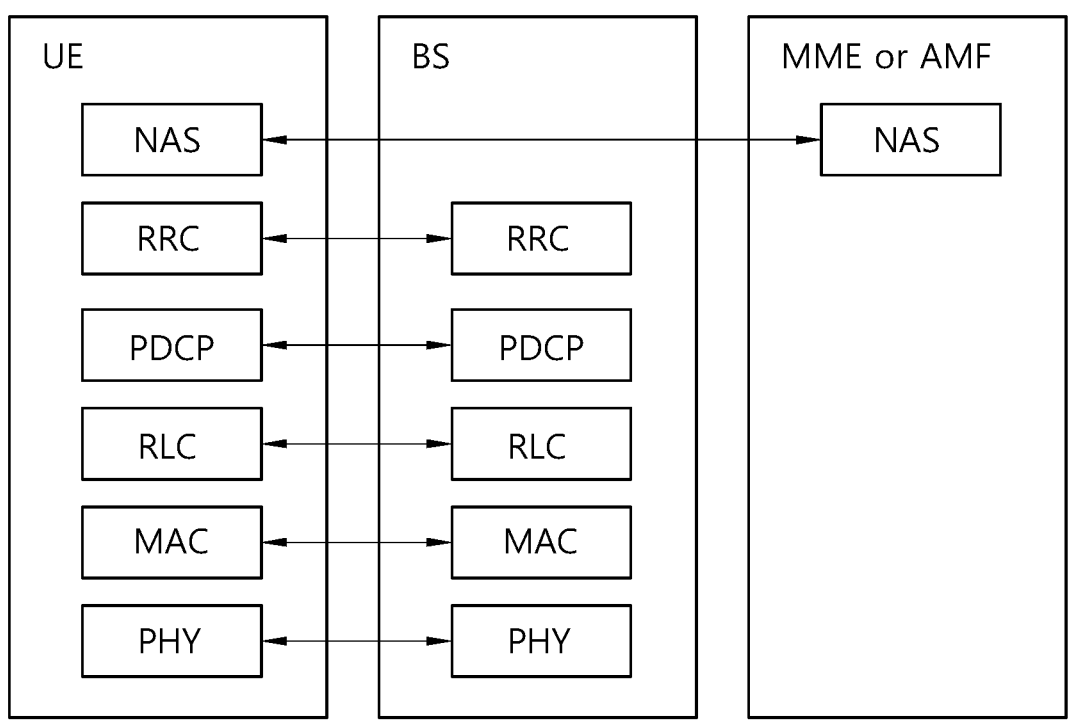

FIGS. 10 and 11 show an example of PC5 protocol stacks to which implementations of the present disclosure is applied.

FIG. 10 illustrates an example of a PC5 control plane (PC5-C) protocol stack between UEs. The AS protocol stack for the control plane in the PC5 interface consists of at least RRC, PDCP, RLC and MAC sublayers, and the physical layer.

FIG. 11 illustrates an example of a PC5 user plane (PC5-U) protocol stack between UEs. The AS protocol stack for user plane in the PC5 interface consists of at least PDCP, RLC and MAC sublayers, and the physical layer.

For the purposes of physical layer analysis, it is assumed that higher layers decide if unicast, groupcast, or broadcast transmission is to be used for a particular data transfer, and they correspondingly inform the physical layer. When considering a unicast or groupcast transmission, it is assumed that the UE is able to establish which unicast or groupcast session a transmission belongs to, and that the following identities is known to the physical layer:

The layer-1 destination ID, conveyed via physical sidelink control channel (PSCCH)

Additional layer-1 ID(s), conveyed via PSCCH, at least for the purpose of identifying which transmissions can be combined in reception when HARQ feedback is in use HARQ process ID For the purpose of Layer 2 analysis, it is assumed that upper layers (i.e., above AS) provide the information on whether it is a unicast, groupcast or broadcast transmission for a particular data transfer. For the unicast and groupcast transmission in SL, the following identities is known to Layer 2:

Unicast: destination ID, source ID

Groupcast: destination group ID, source ID

Discovery procedure and related messages for the unicast and groupcast transmission are up to upper layers.

At least the following two SL resource allocation modes are defined as follows.

(1) Mode 1: BS schedules SL resource(s) to be used by UE for SL transmission(s).

(2) Mode 2: UE determines, i.e., BS does not schedule, SL transmission resource(s) within SL resources configured by BS/network or pre-configured SL resources.

The definition of SL resource allocation Mode 2 covers:

a) UE autonomously selects SL resource for transmission b) UE assists SL resource selection for other UE(s)

c) UE is configured with NR configured grant (Type-1 like) for SL transmission d) UE schedules SL transmissions of other UEs For SL resource allocation Mode 2, sensing and resource (re-)selection-related procedures may be considered. The sensing procedure considered is defined as decoding sidelink control information (SCI) from other UEs and/or SL measurements. The resource (re-)selection procedure considered uses the results of the sensing procedure to determine resource(s) for SL transmission.

For Mode 2(a), SL sensing and resource selection procedures may be considered in the context of a semi-persistent scheme where resource(s) are selected for multiple transmissions of different TBs and a dynamic scheme where resource(s) are selected for each TB transmission.

The following techniques may be considered to identify occupied SL resources:

Decoding of SL control channel transmissions

SL measurements

Detection of SL transmissions

The following aspects may be considered for SL resource selection:

How a UE selects resource for PSCCH and physical sidelink shared channel (PSSCH) transmission (and other SL physical channel/signals that are defined)

Which information is used by UE for resource selection procedure

Mode 2(b) is a functionality that can be part of Mode 2(a), (c), (d) operation.

For out-of-coverage operation, Mode 2(c) assumes a (pre-)configuration of single or multiple SL transmission patterns, defined on each SL resource pool. For in-coverage operation, Mode 2(c) assumes that gNB configuration indicates single or multiple SL transmission patterns, defined on each SL resource pool. If there is a single pattern configured to a transmitting UE, there is no sensing procedure executed by UE, while if multiple patterns are configured, there is a possibility of a sensing procedure.

A pattern is defined by the size and position(s) of the resource in time and frequency, and the number of resources.

For Mode 2(d), the procedures to become or serve as a scheduling UE for in-coverage and out-of-coverage scenarios may be considered as follows:

Scheduling UE is configured by gNB

Application layer or pre-configuration selects scheduling UE

Receiver UE schedules transmissions of the transmitter UE during the session

Scheduling UE is decided by multiple UEs including the one that is finally selected. The UE may autonomously decide to serve as a scheduling UE/offer scheduling UE functions (i.e., by self-nomination).

Until Rel-15, broadcast transmission is supported only for V2X communication. Broadcast transmission means that V2X transmission by one wireless device is broadcast to several unspecified wireless devices. In case of NR V2X, unicast and groupcast transmission may also be supported for V2X communication as well as broadcast transmission. Unicast transmission means that V2X transmission by one wireless device is transmitted to one specified other wireless device. Groupcast transmission means that V2X transmission by one wireless device is transmitted to several specified other wireless devices which belongs to a group. Unicast transmission is expected to be used for high reliability and low latency cases, e.g., extended sensor sharing and remote driving, emergency, etc.

In NR V2X, one wireless device may establish a PC5 link (e.g., one-to-one connection and/or session between wireless devices) for unicast service with another wireless device. PC5 Signaling protocol above RRC layer in the wireless devices may be used for unicast link establishment and management. Based on the unicast link establishment and management, the wireless devices may exchange PC5 signaling (i.e., upper layer signaling than RRC signaling) to successfully or unsuccessfully establish a unicast link with security activation or release the established unicast link.

Herein after, frame structure and physical resources are described. It may be referred to as Section 4 of 3GPP TS 38.211 V15.6.0.

Multiple OFDM numerologies are supported as given by Table 4 where µ and the cyclic prefix for a bandwidth part are obtained from the higher-layer parameter subcarrier-Spacing and cyclicPrefix, respectively.

TABLE 5

| u | $\Delta f = 2^u * 15$ kHz | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

A UE can be configured with up to four bandwidth parts in the downlink with a single downlink bandwidth part being active at a given time. The UE is not expected to receive PDSCH, PDCCH, or CSI-RS (except for RRM) outside an active bandwidth part. A UE can be configured with up to four bandwidth parts in the uplink with a single uplink bandwidth part being active at a given time. If a UE is configured with a supplementary uplink, the UE can in addition be configured with up to four bandwidth parts in the supplementary uplink with a single supplementary uplink bandwidth part being active at a given time. The UE shall not transmit PUSCH or PUCCH outside an active bandwidth part. For an active cell, the UE shall not transmit SRS outside an active bandwidth part.

Hereinafter, bandwidth part operation is described. It may be referred to as section 12 of 3GPP TS 38.213 v15.6.0.

A UE configured for operation in bandwidth parts (BWPs) of a serving cell, is configured by higher layers for the serving cell a set of at most four bandwidth parts (BWPs) for receptions by the UE (DL BWP set) in a DL bandwidth by parameter BWP-Downlink or by parameter initialDownlinkBWP with a set of parameters configured by BWP-DownlinkCommon and BWP-DownlinkDedicated, and a set of at most four BWPs for transmissions by the UE (UL BWP set) in an UL bandwidth by parameter BWP-Uplink or by parameter initialUplinkBWP with a set of parameters configured by BWP-UplinkCommon and BWP-UplinkDedicated.

If a UE is not provided initialDownlinkBWP, an initial DL BWP is defined by a location and number of contiguous PRBs, starting from a PRB with the lowest index and ending at a PRB with the highest index among PRBs of a CORESET for Type0-PDCCH CSS set, and a SCS and a cyclic prefix for PDCCH reception in the CORESET for Type0-PDCCH CSS set; otherwise, the initial DL BWP is provided by initialDownlinkBWP. For operation on the primary cell or on a secondary cell, a UE is provided an initial UL BWP by initialUplinkBWP. If the UE is configured with a supplementary UL carrier, the UE can be provided an initial UL BWP on the supplementary UL carrier by initialUplinkBWP.

If a UE has dedicated BWP configuration, the UE can be provided by firstActiveDownlinkBWP-Id a first active DL BWP for receptions and by firstActiveUplinkBWP-Id a first active UL BWP for transmissions on a carrier of the primary cell.

For each DL BWP or UL BWP in a set of DL BWPs or UL BWPs, respectively, the UE is provided the following parameters for the serving cell:

a SCS by subcarrierSpacing a cyclic prefix by cyclicPrefix a common RB $N^{start}_{BWP}=O_{carrier}+RB_{start}$ and a number of contiguous RBs $N^{size}_{BWP}=L_{RB}$ provided by locationAndBandwidth that indicates an offset $RB_{start}$ and a length $L_{RB}$ as RIV, setting $N^{size}_{BWP}=275$, and a value $O_{carrier}$ provided by offsetToCarrier for the subcarrierSpacing an index in the set of DL BWPs or UL BWPs by respective BWP-Id a set of BWP-common and a set of BWP-dedicated parameters by BWP-DownlinkCommon and BWP-DownlinkDedicated for the DL BWP, or BWP-UplinkCommon and BWP-UplinkDedicated for the UL BWP For unpaired spectrum operation, a DL BWP from the set of configured DL BWPs with index provided by BWP-Id is linked with an UL BWP from the set of configured UL BWPs with index provided by BWP-Id when the DL BWP index and the UL BWP index are same. For unpaired spectrum operation, a UE does not expect to receive a configuration where the center frequency for a DL BWP is different than the center frequency for an UL BWP when the BWP-Id of the DL BWP is same as the BWP-Id of the UL BWP.

For each DL BWP in a set of DL BWPs of the PCell, or of the PUCCH-SCell, a UE can be configured CORESETs for every type of CSS sets and for USS. The UE does not expect to be configured without a CSS set on the PCell, or on the PUCCH-SCell, of the MCG in the active DL BWP.

If a UE is provided controlResourceSetZero and searchSpaceZero in PDCCH-ConfigSIB1 or PDCCH-ConfigCommon, the UE determines a CORESET for a search space set from controlResourcesetZero as described in Subclause 13 and for Tables 13-1 through 13-10, and determines corresponding PDCCH monitoring occasions as described in Subclause 13 and for Tables 13-11 through 13-15. If the active DL BWP is not the initial DL BWP, the UE determines PDCCH monitoring occasions for the search space set only if the CORESET bandwidth is within the active DL BWP and the active DL BWP has same SCS configuration and same cyclic prefix as the initial DL BWP.

For each UL BWP in a set of UL BWPs of the PCell or of the PUCCH-SCell, the UE is configured resource sets for PUCCH transmissions.

A UE receives PDCCH and PDSCH in a DL BWP according to a configured SCS and CP length for the DL BWP. A UE transmits PUCCH and PUSCH in an UL BWP according to a configured SCS and CP length for the UL BWP.

If a bandwidth part indicator field is configured in DCI format 1_1, the bandwidth part indicator field value indicates the active DL BWP, from the configured DL BWP set, for DL receptions. If a bandwidth part indicator field is configured in DCI format 0_1, the bandwidth part indicator field value indicates the active UL BWP, from the configured UL BWP set, for UL transmissions. If a bandwidth part indicator field is configured in DCI format 0_1 or DCI format 1_1 and indicates an UL BWP or a DL BWP different from the active UL BWP or DL BWP, respectively, the UE shall
- for each information field in the received DCI format 0_1 or DCI format 1_1
  - if the size of the information field is smaller than the one required for the DCI format 0_1 or DCI format 1_1 interpretation for the UL BWP or DL BWP that is indicated by the bandwidth part indicator, respectively, the UE prepends zeros to the information field until its size is the one required for the interpretation of the information field for the UL BWP or DL BWP prior to interpreting the DCI format 0_1 or DCI format 1_1 information fields, respectively
  - if the size of the information field is larger than the one required for the DCI format 0_1 or DCI format 1_1 interpretation for the UL BWP or DL BWP that is indicated by the bandwidth part indicator, respectively, the UE uses a number of least significant bits of DCI format 0_1 or DCI format 1_1 equal to the one required for the UL BWP or DL BWP indicated by bandwidth part indicator prior to interpreting the DCI format 0_1 or DCI format 1_1 information fields, respectively
- set the active UL BWP or DL BWP to the UL BWP or DL BWP indicated by the bandwidth part indicator in the DCI format 0_1 or DCI format 1_1, respectively A UE does not expect to detect a DCI format 1_1 or a DCI format 0_1 indicating respectively an active DL BWP or an active UL BWP change with the corresponding time domain resource assignment field providing a slot offset value for a PDSCH reception or PUSCH transmission that is smaller than a delay required by the UE for an active DL BWP change or UL BWP change.

If a UE detects a DCI format 1_1 indicating an active DL BWP change for a cell, the UE is not required to receive or transmit in the cell during a time duration from the end of the third symbol of a slot where the UE receives the PDCCH that includes the DCI format 1_1 in a scheduling cell until the beginning of a slot indicated by the slot offset value of the time domain resource assignment field in the DCI format 1_1.

If a UE detects a DCI format 0_1 indicating an active UL BWP change for a cell, the UE is not required to receive or transmit in the cell during a time duration from the end of the third symbol of a slot where the UE receives the PDCCH that includes the DCI format 0_1 in the scheduling cell until the beginning of a slot indicated by the slot offset value of the time domain resource assignment field in the DCI format 0_1.

A UE does not expect to detect a DCI format 1_1 indicating an active DL BWP change or a DCI format 0_1 indicating an active UL BWP change for a scheduled cell within FR1 (or FR2) in a slot other than the first slot of a set of slots for the DL SCS of the scheduling cell that overlaps with a time duration where the UE is not required to receive or transmit for an active BWP change in a different cell from the scheduled cell within FR1 (or FR2).

A UE expects to detect a DCI format 0_1 indicating active UL BWP change, or a DCI format 1_1 indicating active DL BWP change, only if a corresponding PDCCH is received within the first 3 symbols of a slot.

For a serving cell, a UE can be provided by defaultDownlinkBWP-Id a default DL BWP among the configured DL BWPs. If a UE is not provided a default DL BWP by defaultDownlinkBWP-Id, the default DL BWP is the initial DL BWP.

If a UE is provided by bwp-InactivityTimer a timer value for the serving cell and the timer is running, the UE decrements the timer at the end of a subframe for FR1 or at the end of a half subframe for FR2 if the restarting conditions are not met during the interval of the subframe for FR1 or of the half subframe for FR2.

For a cell where a UE changes an active DL BWP due to a BWP inactivity timer expiration and for accommodating a delay in the active DL BWP change or the active UL BWP change, the UE is not required to receive or transmit in the cell during a time duration from the beginning of a subframe for FR1, or of half of a subframe for FR2, that is immediately after the BWP inactivity timer expires until the beginning of a slot where the UE can receive or transmit.

When a UE's BWP inactivity timer for a cell expires within a time duration where the UE is not required to receive or transmit for an active UL/DL BWP change in the cell or in a different cell, the UE delays the active UL/DL BWP change triggered by the BWP inactivity timer expiration until a subframe for FR1 or half a subframe for FR2 that is immediately after the UE completes the active UL/DL BWP change in the cell or in the different cell.

If a UE is provided by firstActiveDownlinkBWP-Id a first active DL BWP and by firstActiveUplinkBWP-Id a first active UL BWP on a carrier of a secondary cell, the UE uses the indicated DL BWP and the indicated UL BWP as the respective first active DL BWP on the secondary cell and first active UL BWP on the carrier of the secondary cell.

For paired spectrum operation, a UE does not expect to transmit a PUCCH with HARQ-ACK information on a PUCCH resource indicated by a DCI format 1_0 or a DCI format 1_1 if the UE changes its active UL BWP on the PCell or PUCCH-SCell between a time of a detection of the DCI format 1_0 or the DCI format 1_1 and a time of a corresponding PUCCH transmission with HARQ-ACK information.

Meanwhile, as described above, a wireless device could configure multiple bandwidth parts (BWPs). A wireless could configure multiple uplink (UL) BWPs for UL transmission. A wireless device could configure at least one sidelink BWP for sidelink (SL) transmission.

At least one BWP among the multiple UL BWPs could be active. Other UL BWPs except the at least one active UL BWP would be inactive. In addition, at least one SL BWP could be active and other SL BWPs would be inactive.

The BWP switching may be used to activate an inactive BWP and deactivate an active BWP at a time. For example, a wireless device could perform UL BWP switching to activate an inactive UL BWP and deactivate an active SL BWP. For example, a wireless device could perform SL BWP switching to activate an inactive SL BWP and deactivate an active SL BWP.

However, a wireless device could not always use the active UL BWP and the active SL BWP simultaneously. For example, if the numerology of the active UL BWP is different than the numerology of the active SL BWP, a wireless device could not perform both UL transmission and SL transmission simultaneously.

It may happen that the wireless device could not use the both the activated UL BWP and the activated SL BWP, after performing a BWP switching.

Thus, studies for handling BWP switching based on priority in a wireless communication system are required.

Hereinafter, a method and apparatus for handling BWP switching based on priority in a wireless communication system, according to some embodiments of the present disclosure, will be described with reference to the following drawings.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings. Herein, a wireless device may be referred to as a user equipment (UE).

Figure 12:
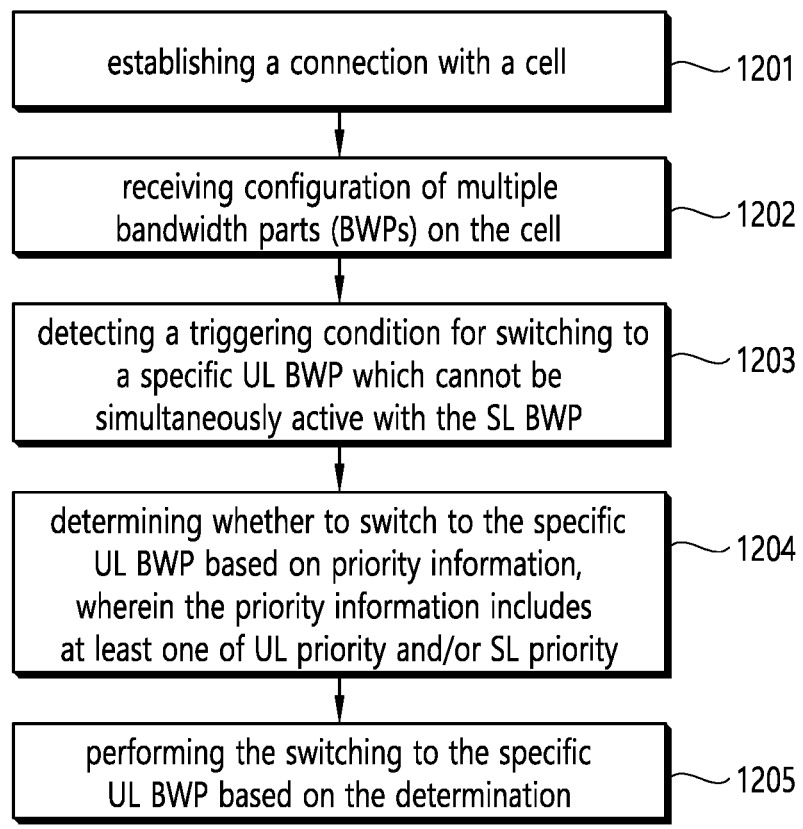
FIG. 12 shows an example of a method for handling BWP switching based on priority in a wireless communication system, according to some embodiments of the present disclosure.

FIG. 12 shows an example of a method for handling BWP switching based on priority in a wireless communication system, according to some embodiments of the present disclosure.

In particular, FIG. 12 shows an example of a method performed by a wireless device.

In step 1201, a wireless device may establish a connection with a cell. For example, a wireless device may initiate Random Access procedure to the cell.

In step 1202, a wireless device may receives configuration of multiple bandwidth parts (BWPs) on the cell. The multiple BWPs may include at least one active uplink (UL) BWP for UL transmission and at least one active sidelink (SL) BWP for SL transmission.

For example, a wireless device may configure with one or multiple BWPs. For example, the maximum number of BWP per a cell may be configured by a network.

In step 1203, a wireless device may detect a triggering condition for switching to a specific UL BWP which cannot be simultaneously active with the active SL BWP.

According to some embodiments of the present disclosure, the wireless device may determine that the triggering condition for switching to the specific UL BWP is detected, when the wireless device receives a Downlink Control Information (DCI) indicating the switching to the specific UL BWP. For example, the DCI may include an indication indicating the specific UL BWP.

According to some embodiments, the wireless device may determine that the triggering condition for switching to the specific UL BWP is detected, when the wireless device receives a Physical Downlink Control Channel (PDCCH) for BWP switching.

For example, when a MAC entity of a wireless device receives a PDCCH for BWP switching, the MAC entity may perform BWP switching to a BWP indicated by the PDCCH.

More specifically, (i) if there is no ongoing Random Access procedure associated with this Serving Cell, or (ii) if the ongoing Random Access procedure associated with this Serving Cell is successfully completed upon reception of this PDCCH addressed to C-RNTI, the MAC entity of the wireless device may attempt to switch an active BWP to a BWP indicated by the PDCCH.

According to some embodiments, the wireless device may determine that the triggering condition for switching to the specific UL BWP is detected, when the wireless device detects that Physical Random Access Channel (PRACH) occasions are not configured for the active UL BWP.

More specifically, a wireless device may perform initiation of the Random Access procedure on a serving cell. After the selection of carrier for performing Random Access procedure, the MAC entity of the wireless device may determine that the triggering condition for switching the active UL BWP is detected, if PRACH occasions are not configured for the active UL BWP.

For example, if PRACH occasions are not configured for the active UL BWP, the wireless device may attempt to switch the active UL BWP to a BWP indicated by initialUplinkBWP.

According to some embodiments, the wireless device may determine that the triggering condition for switching to the specific UL BWP is detected, when a BWP timer is expired.

For example, a MAC entity of a wireless device may start or restart a BWP timer, (i) if there is no ongoing Random Access procedure associated with this Serving Cell, or (ii) if the ongoing Random Access procedure associated with this Serving Cell is successfully completed upon reception of this PDCCH addressed to C-RNTI.

For example, a wireless device may attempt to switch an active BWP to a BWP indicated by the defaultBWP-Id or the initialBWP upon the expiry of the BWP timer.

According to some embodiments, the specific UL BWP cannot be simultaneously active with the active SL BWP, based on that a numerology of the specific UL BWP is different than a numerology of the active SL BWP.

For example, when a subcarrier spacing and/or a cyclic prefix of the specific UL BWP is different than a subcarrier spacing and/or a cyclic prefix of the active SL BWP, the specific UL BWP cannot be simultaneously active with the active SL BWP.

In step 1204, a wireless device may determine whether to switch to the specific UL BWP based on priority information. The priority information may include at least one of UL priority and/or SL priority.

For example, upon detecting the triggering condition for switching to a specific UL BWP, the wireless device may determine whether to perform the switching to the specific UL BWP based on the priority information.

According to some embodiments of the present disclosure, the priority information may be determined by the wireless device.

For example, the UL Priority may be correspond to the highest priority of logical channels having uplink data.

For example, the SL Priority may be correspond to the highest priority of logical channels having sidelink data.

According to some embodiments of the present disclosure, the priority information may include at least one of a UL priority value and/or a SL priority value. For example, the UL priority may be described as a UL priority value and the SL priority may be described as a SL priority value.

More specifically, a UL priority value may be a number between zero and 7. When a UL priority value approaches to zero, the UL priority becomes higher. When a UL priority value approaches to 7, the UL priority becomes lower.

On the other hand, a SL priority value may be a number between 1 and 8. When a SL priority value approaches to 1, the SL priority becomes higher. When a SL priority value approaches to 8, the SL priority becomes lower.

The priority information may include a UL threshold and a SL threshold.

For example, when a UL priority value is higher than the UL threshold, the UL priority may be determined as a low priority. For example, when a UL priority value is lower than or equal to the UL threshold, the UL priority may be determined as a high priority.

For example, when a SL priority value is higher than the SL threshold, the SL priority may be determined as a low priority. For example, when a SL priority value is lower than or equal to the SL threshold, the SL priority may be determined as a high priority.

According to some embodiments of the present disclosure, the priority information may be included in the DCI.

For example, the DCI may indicate the wireless device to switch to the specific UL BWP. For example, the wireless device may determine that the triggering condition is met upon receiving the DCI indicating the switching to the specific UL BWP.

For example, the UL Priority may be indicated by the DCI. For example, the UL priority may be indicated as a high priority or a low priority by the DCI.

In this case, the UL priority may be determined as a high priority of a low priority, without regard to the UL priority corresponding to the highest priority of logical channels having uplink data.

According to some embodiments of the present disclosure, a wireless device may determine to switch to the specific UL BWP based on that the DCI indicates high priority for the UL priority.

In other words, when the UL priority has a high priority, the wireless device may determine to switch to the specific UL BWP.

According to some embodiments of the present disclosure, a wireless device may determine not to switch to the specific UL BWP based on that (i) the DCI indicates low priority for the UL priority, and (ii) a value of the SL priority is lower than or equal to a SL threshold.

In other words, when (i) the UL priority has a low priority, and (ii) the SL priority has a high priority, the wireless device may determine not to switch to the specific UL BWP.

According to some embodiments of the present disclosure, a wireless device may determine to switch to the specific UL BWP based on that a value of the UL priority (or the UL priority value) is lower than or equal to a UL threshold or a value of the SL priority (or the SL priority value).

In other words, (i) if a UL priority has a high priority, or (ii) if the UL priority is higher than or equal to the SL priority, the wireless device may determine to switch to the specific UL BWP.

According to some embodiments of the present disclosure, a wireless device may determine to switch to the specific UL BWP based on that a value of the SL priority (or the SL priority value) is higher than a SL threshold.

In other words, if a SL priority has a low priority, the wireless device may determine to switch to the specific UL BWP.

According to some embodiments of the present disclosure, a wireless device may determine not to switch to the specific UL BWP based on that (i) a value of the UL priority is higher than a UL threshold and a value of the SL priority, and (ii) the value of the SL priority is lower than or equal to a SL threshold.

In other words, (i) if a UL priority has a low priority, (ii) if the UL priority is lower than the SL priority, and (iii) the SL priority has a high priority, the wireless device may determine not to switch to the specific UL BWP.

In step 1205, a wireless device may perform the switching to the specific UL BWP based on the determination. For example, the wireless device may deactivate the active SL BWP. In this case, a wireless device may stop sidelink transmission and reception on the deactivated SL BWP.

According to some embodiments of the present disclosure, the wireless device may switching the active SL BWP to another SL BWP. For example, the wireless device may activating another SL BWP having same numerology with the specific UL BWP, upon deactivating the active SL BWP.

According to some embodiments of the present disclosure, the wireless device may switch to a default SL BWP (if configured by RRC) or an initial SL BWP in which the wireless device performs transmission or reception of a PC5-RRC message or a PC5-S message at an initial stage.

According to some embodiments of the present disclosure, the wireless device may not perform the switching the active UL BWP to the specific UL BWP.

In this case, for example, a wireless device may deactivate the active UL BWP. For example, a wireless device may perform UL BWP switching to a default UL BWP (if configured by RRC) or an initial UL BWP.

According to some embodiments of the present disclosure, the wireless device may be in communication with at least one of a user equipment, a network, or an autonomous vehicle other than the wireless device.

Figure 13:
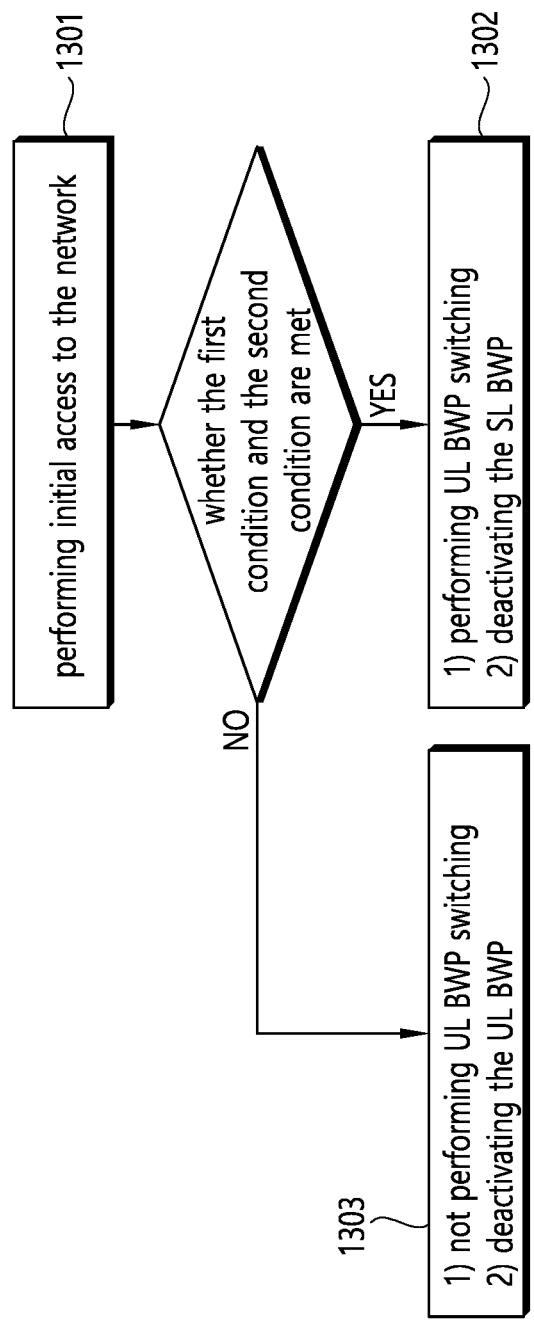
FIG. 13 shows an example of a method for performing data transmission by a wireless device in a wireless communication system, according to some embodiments of the present disclosure.

FIG. 13 shows an example of a method for performing data transmission by a wireless device in a wireless communication system, according to some embodiments of the present disclosure.

In particular, FIG. 13 shows an example of method performed by a wireless device, for example, a User Equipment (UE).

In step 1301, UE may perform initial access to the network.

In step 1302, when the first condition and the second condition are met, UE may perform UL BWP switching and deactivate the SL BWP. In this case, UE may stop sidelink transmission and reception on the deactivated SL BWP.

Alternatively, for example, when the first condition and the second condition are met, UE may switch to a new SL BWP having the same numerology with the activated or switched UL BWP.

For other example, UE may switch to a default SL BWP (if configured by RRC) or an initial SL BWP in which the UE performs transmission or reception of a PC5-RRC message or a PC5-S message at an initial stage.

For example, the first condition may be satisfied (i) when the numerology of the active UL BWP is different than the numerology of the active SL BWP, and/or (ii) when UE cannot perform both UL transmission on the UL BWP and SL transmission on the SL BWP simultaneously.

For example, the second condition may be satisfied (iii) if the priority value indicated by the PDCCH (or the highest priority of logical channels mapped to the UL BWP or the priority of the UL BWP) is equal to or lower than the priority value of logical channels mapped to the SL BWP (or the priority of SL BWP) (for example, the priority (or the priority level) indicated by the PDCCH (or the highest priority of logical channels mapped to the UL BWP or the priority of the UL BWP) is prioritized/higher than the priority of logical channels mapped to the SL BWP (or the priority of SL BWP)), or (iv) if the highest priority value of logical channels mapped to the SL BWP (or the priority of SL BWP) is higher than the threshold (for example, the highest priority of logical channels mapped to the SL BWP (or the priority of SL BWP) is de-prioritized/equal to or lower than the threshold).

In step 1303, if at least one of the first condition or the second condition is not met, UE may not perform UL BWP switching and deactivate UL BWP.

Alternatively, for example, UE may perform UL BWP switching to a default UL BWP (if configured by RRC) or an initial UL BWP.

Figure 14:
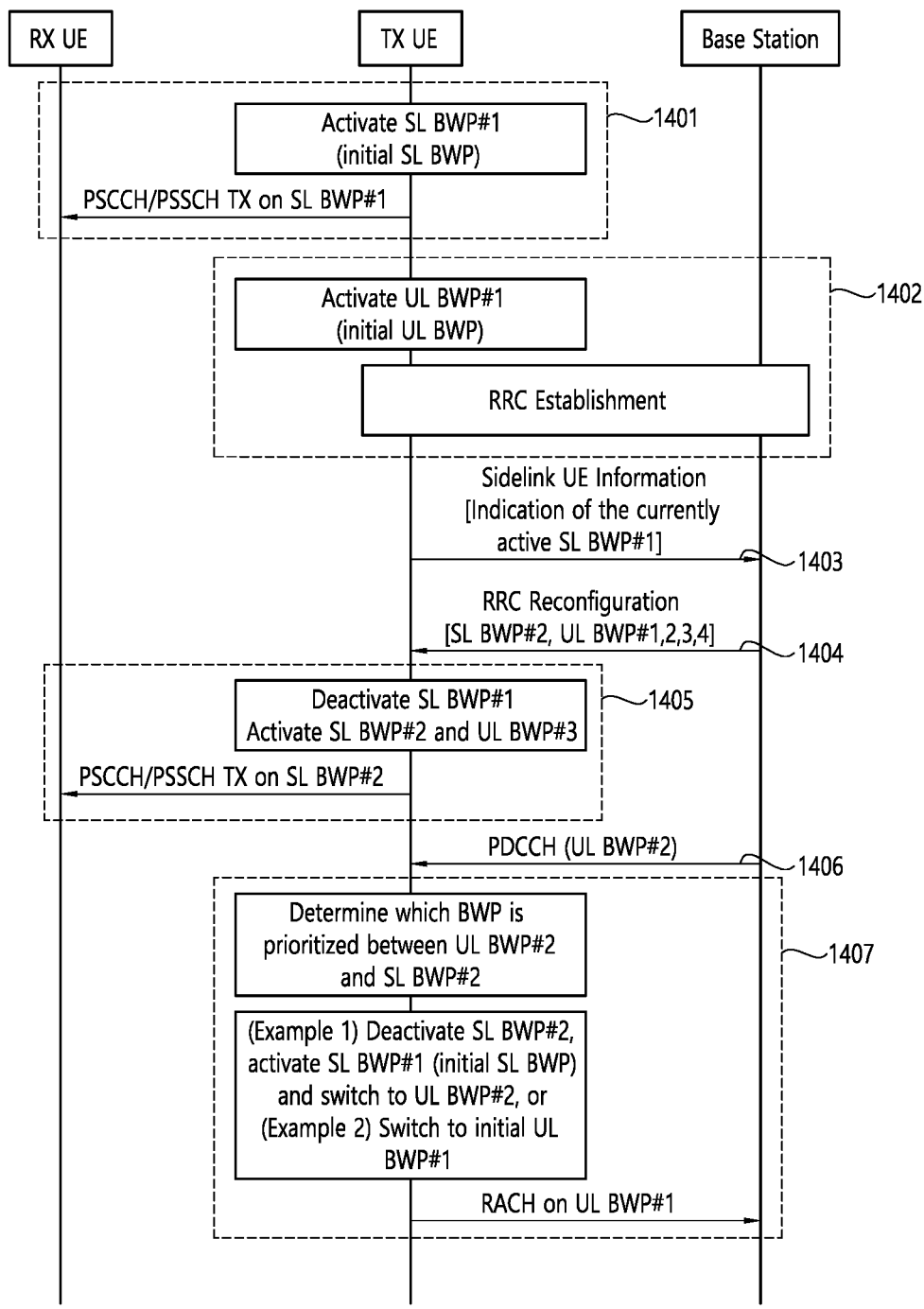
FIG. 14 shows an example of a method for performing data transmission in a wireless communication system, according to some embodiments of the present disclosure.

FIG. 14 shows an example of a method for performing data transmission in a wireless communication system, according to some embodiments of the present disclosure.

In particular FIG. 14 shows an example of method for sidelink data transmission, according to some embodiments of the present disclosure. However, it is clear that present disclosure is not limited thereto. The present disclosure can be applied to uplink data transmission as well.

In step 1401, UE may activates SL BWP#1 for sidelink transmission for a destination (or a service). UE may consider the SL BWP#1 as an initial SL BWP for the destination. UE may perform SL transmission and reception on the SL BWP#1.

In other words, the transmission UE (TX UE) may activate the SL BWP #1 (for example, an initial SL BWP. the TX UE may perform the Physical Sidelink Shared Channel (PSSCH) and/or Physical Sidelink Control Channel (PSCCH) transmission to the reception UE (RX UE) on the SL BWP #1.

In step 1402, the UE may perform initial access towards the cell. The UE and the cell may perform RACH procedure. For RRC establishment, UE may activate UL BWP#1 which is the initial UL BWP. The UE may establish or resume a connection with the gNB and enters RRC_CONNECTED. The UE may perform AS security activation upon receiving Security Mode Command from the gNB. The UE may configure radio bearers and radio configuration upon receiving RRC reconfiguration or resumes radio bearers and radio configuration upon receiving RRC resume.

For example, TX UE may activate the UL BWP #1 (for example, initial UL BWP). TX UE may perform RRC establishment procedure to the base station.

In step 1403, after entering RRC_CONNECTED, UE may inform NG-RAN about the destination and the currently active SL BWP#1 mapped to the destination.

For example, TX UE may transmit, to the base station, sidelink UE information including indication of the currently active SL BWP #1.

In step 1404, NG-RAN may reconfigure SL BWP and UL BWP. Then, TX UE may receive, from the base station, RRC Reconfiguration including information on SL BWP #2 and/or UL BWP #1, 2, 3, 4.

In step 1405, upon receiving the reconfiguration, UE may switches from SL BWP#1 to SL BWP#2 and indicate this SL BWP switching to the other UE. UE may perform SL transmission and reception on SL BWP#2. Upon receiving the reconfiguration, UE may also switch from UL BWP#1 to UL BWP#3.

For example, the TX UE may 1) deactivate the SL BWP #1, and 2) activate the SL BWP #2 and the UL BWP #3. The TX UE may perform PSCCH and/or PSSCH transmission on the SL BWP #2.

In step 1406, the TX UE may receive, from the base station, PDCCH indicating switching to UL BWP #2. The PDCCH may indicate the priority of the UL BWP #2 and/or UL transmission on UL BWP #2.

In step 1407, upon receiving the PDCCH indicating switching to the UL BWP #2 from the base station, the TX UE may determine whether to perform the BWP switching or not. The TX UE may determine which BWP is prioritized between UL BWP #2 and SL BWP #2.

For example, based on the determination, the TX UE may deactivate SL BWP #2, activate SL BWP #1, and switch to UL BWP #2.

For other example, based on the determination, the TX UE may switch to initial UL BWP #1. In this case, the TX UE may perform random access procedure to the based station on the UL BWP #1.

More specifically, when the first condition and the second condition are met, UE may perform UL BWP switching to UL BWP #2 and deactivate the SL BWP #2. In this case, UE may stop sidelink transmission and reception on the deactivated SL BWP #2.

Alternatively, for example, when the first condition and the second condition are met, UE may switch to a new SL BWP #3 having the same numerology with the activated or switched UL BWP #2.

For other example, UE may switch to a default SL BWP #1 (if configured by RRC) or an initial SL BWP in which the UE performs transmission or reception of a PC5-RRC message or a PC5-S message at an initial stage.

On the other hand, if at least one of the first condition or the second condition is not met, UE may not perform UL BWP switching to UL BWP #2 and deactivate UL BWP #3.

Alternatively, for example, if at least one of the first condition or the second condition is not met, UE may perform UL BWP switching to a default UL BWP (if configured by RRC) or an initial UL BWP #1.

The first condition may be satisfied (i) when the numerology of the UL BWP#2 is different than the numerology of the active SL BWP#2, and/or (ii) when UE cannot perform both UL transmission on the UL BWP#2 and SL transmission on the SL BWP#2 simultaneously.

The second condition may be satisfied (iii) if the priority value indicated by the PDCCH (or the highest priority of logical channels mapped to the UL BWP or the priority of the UL BWP) is equal to or lower than the priority value of logical channels mapped to the SL BWP (or the priority of SL BWP) (for example, the priority indicated by the PDCCH (or the highest priority of logical channels mapped to the UL BWP or the priority of the UL BWP) is prioritized/higher than the priority of logical channels mapped to the SL BWP (or the priority of SL BWP)); or (iv) if the highest priority value of logical channels mapped to the SL BWP (or the priority of SL BWP) is higher than the threshold (for example, the highest priority of logical channels mapped to the SL BWP (or the priority of SL BWP) is de-prioritized/ equal to or lower than the threshold).

Hereinafter, a method for handling BWP switching based on priority in a wireless communication system, according to some embodiments of the present disclosure will be described. The method may be performed by a wireless device, for example, a UE. The UE may perform the BWP operations below.

A Serving Cell may be configured with one or multiple BWPs, and the maximum number of BWP per Serving Cell could be predetermined.

The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signalling, or by the MAC entity itself upon initiation of Random Access procedure. Upon RRC (re-)configuration of firstActiveDownlinkBWP-Id and/or firstActiveUplinkBWP-Id for SpCell or activation of an SCell, the DL BWP and/or UL BWP indicated by firstActiveDownlinkBWP-Id and/or firstActiveUplinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL.

For each activated Serving Cell configured with a BWP, the MAC entity of the UE shall:

1> if a BWP is activated:
2> transmit on UL-SCH on the BWP;
2> transmit on RACH on the BWP, if PRACH occasions are configured;
2> monitor the PDCCH on the BWP;

2> transmit PUCCH on the BWP, if configured;
2> report CSI for the BWP;
2> transmit SRS on the BWP, if configured;
2> receive DL-SCH on the BWP;
2> (re-)initialize any suspended configured uplink grants of configured grant Type 1 on the active BWP according to the stored configuration, if any, and to start in the symbol.
1> if a BWP is deactivated:
2> not transmit on UL-SCH on the BWP;
2> not transmit on RACH on the BWP;
2> not monitor the PDCCH on the BWP;
2> not transmit PUCCH on the BWP;
2> not report CSI for the BWP;
2> not transmit SRS on the BWP;
2> not receive DL-SCH on the BWP;
2> clear any configured downlink assignment and configured uplink grant of configured grant Type 2 on the BWP;
2> suspend any configured uplink grant of configured grant Type 1 on the inactive BWP.

Upon initiation of the Random Access procedure on a Serving Cell, after the selection of carrier for performing Random Access, the MAC entity shall for the selected carrier of this Serving Cell:
1> if PRACH occasions are not configured for the active UL BWP:
2> switch the active UL BWP to BWP indicated by initialUplinkBWP;
2> if the Serving Cell is an SpCell:
3> switch the active DL BWP to BWP indicated by initialDownlinkBWP.
1> else:
2> if the Serving Cell is an SpCell:
3> if the active DL BWP does not have the same bwp-Id as the active UL BWP:
4> switch the active DL BWP to the DL BWP with the same bwp-Id as the active UL BWP.
1> stop the bwp-InactivityTimer associated with the active DL BWP of this Serving Cell, if running.
1> if the Serving Cell is SCell:
2> stop the bwp-InactivityTimer associated with the active DL BWP of SpCell, if running.
1> perform the Random Access procedure on the active DL BWP of SpCell and active UL BWP of this Serving Cell.

If the MAC entity receives a PDCCH for BWP switching of a Serving Cell, the MAC entity shall:
1> if there is no ongoing Random Access procedure associated with this Serving Cell; or
1> if the numerology of the UL BWP indicated the PDCCH for BWP switching is same as the numerology of the active SL BWP; or
1> if the numerology of the UL BWP indicated the PDCCH for BWP switching is different than the numerology of the active SL BWP, and the priority indicated by the PDCCH (or the highest priority of logical channels mapped to the UL BWP or the priority of the UL BWP) is higher than the highest priority of logical channels mapped to the SL BWP (or the priority of SL BWP); or
1> if the numerology of the UL BWP indicated the PDCCH for BWP switching is different than the numerology of the active SL BWP, and the highest priority of logical channels mapped to the SL BWP (or the priority of SL BWP) is equal to or lower than the threshold; or
1> if the ongoing Random Access procedure associated with this Serving Cell is successfully completed upon reception of this PDCCH addressed to C-RNTI:
2> perform BWP switching to a BWP indicated by the PDCCH.

If the MAC entity receives a PDCCH for BWP switching for a Serving Cell while a Random Access procedure associated with that Serving Cell is ongoing in the MAC entity, it is up to UE implementation whether to switch BWP or ignore the PDCCH for BWP switching, except for the PDCCH reception for BWP switching addressed to the C-RNTI for successful Random Access procedure completion in which case the UE shall perform BWP switching to a BWP indicated by the PDCCH. Upon reception of the PDCCH for BWP switching other than successful contention resolution, if the MAC entity decides to perform BWP switching, the MAC entity shall stop the ongoing Random Access procedure and initiate a Random Access procedure after performing the BWP switching; if the MAC decides to ignore the PDCCH for BWP switching, the MAC entity shall continue with the ongoing Random Access procedure on the Serving Cell.

Upon reception of RRC (re-)configuration for BWP switching for a Serving Cell while a Random Access procedure associated with that Serving Cell is ongoing in the MAC entity, the MAC entity shall stop the ongoing Random Access procedure and initiate a Random Access procedure after performing the BWP switching.

The MAC entity shall for each activated Serving Cell configured with bwp-InactivityTimer:
1> if the defaultDownlinkBWP-Id is configured, and the active DL BWP is not the BWP indicated by the defaultDownlinkBWP-Id; or
1> if the defaultDownlinkBWP-Id is not configured, and the active DL BWP is not the initialDownlinkBWP:
2> if a PDCCH addressed to C-RNTI or CS-RNTI indicating downlink assignment or uplink grant is received on the active BWP; or
2> if a PDCCH addressed to C-RNTI or CS-RNTI indicating downlink assignment or uplink grant is received for the active BWP; or
2> if a MAC PDU is transmitted in a configured uplink grant or received in a configured downlink assignment:
3> if there is no ongoing Random Access procedure associated with this Serving Cell; or
3> if the ongoing Random Access procedure associated with this Serving Cell is successfully completed upon reception of this PDCCH addressed to C-RNTI:
4> start or restart the bwp-InactivityTimer associated with the active DL BWP.
2> if the bwp-InactivityTimer associated with the active DL BWP expires:
2> if the numerology of the active UL BWP is different than the numerology of the active SL BWP, and the priority indicated by the PDCCH (or the highest priority of logical channels mapped to the UL BWP or the priority of the UL BWP) is equal to or lower than the priority of logical channels mapped to the SL BWP (or the priority of SL BWP); or
2> if the numerology of the UL BWP indicated the PDCCH for BWP switching is different than the numerology of the active SL BWP, and the highest priority of logical channels mapped to the SL BWP (or the priority of SL BWP) is higher than the threshold; or
3> if the defaultDownlinkBWP-Id is configured:
4> perform BWP switching to a BWP indicated by the defaultDownlinkBWP-Id.

3> else:
4> perform BWP switching to the initialDownlinkBWP.
If a Random Access procedure is initiated on an SCell, both this SCell and the SpCell are associated with this Random Access procedure.
1> if a PDCCH for BWP switching is received, and the MAC entity switches the active DL BWP:
2> if the defaultDownlinkBWP-Id is configured, and the MAC entity switches to the DL BWP which is not indicated by the defaultDownlinkBWP-Id; or
2> if the defaultDownlinkBWP-Id is not configured, and the MAC entity switches to the DL BWP which is not the initialDownlinkBWP:
3> start or restart the bwp-InactivityTimer associated with the active DL BWP.

In addition, The UE may perform the BWP operation for sidelink as below.

The MAC entity is configured with at most a single SL BWP where sidelink transmission and reception are performed.

For a BWP, the MAC entity shall:
1> if the BWP is activated for sidelink transmission:
2> transmit PSBCH on the BWP, if configured;
2> transmit PSCCH on the BWP;
2> transmit SL-SCH on the BWP;
2> transmit CSI-RS on the BWP;
2> receive CSI reporting on the BWP, if configured and enabled;
2> receive PSFCH on the BWP, if configured.
1> if the BWP is activated for sidelink reception:
2> receive PSBCH on the BWP, if configured;
2> receive PSCCH on the BWP;
2> receive SL-SCH on the BWP;
2> receive CSI-RS on the BWP;
2> report CSI on the BWP, if configured and enabled;
2> transmit PSFCH on the BWP, if configured.
1> if a UL BWP is activated or switched as above and the SL BWP has a different numerology than the activated or switched UL BWP for sidelink reception:
2> deactivates the SL BWP and stops sidelink transmission and reception on the SL BWP; or
2> switches to a new SL BWP having the same numerology with the activated or switched UL BWP; or
2> switches to a default SL BWP (if configured by RRC) or an initial SL BWP in which the UE performs transmission or reception of a PC5-RRC message or a PC5-S message at an initial stage.

Hereinafter, an apparatus for handling BWP switching based on priority in a wireless communication system, according to some embodiments of the present disclosure, will be described. Herein, the apparatus may be a wireless device (100 or 200) in FIGS. 2, 3, and 5.

For example, a wireless device may perform methods described in FIGS. 12 to 14. The detailed description overlapping with the above-described contents could be simplified or omitted.

Referring to FIG. 5, a wireless device 100 may include a processor 102, a memory 104, and a transceiver 106.

According to some embodiments of the present disclosure, the processor 102 may be configured to be coupled operably with the memory 104 and the transceiver 106.

The processor 102 may be configured to establish a connection with a cell. The processor 102 may be configured to control the transceiver 106 to receive configuration of multiple bandwidth parts (BWPs) on the cell, wherein the multiple BWPs includes at least one active uplink (UL) BWP for UL transmission and at least one active sidelink (SL) BWP for SL transmission. The processor 102 may be configured to detect a triggering condition for switching to a specific UL BWP which cannot be simultaneously active with the active SL BWP. The processor 102 may be configured to determine whether to switch to the specific UL BWP based on priority information, wherein the priority information includes at least one of UL priority and/or SL priority. The processor 102 may be configured to perform the switching to the specific UL BWP based on the determination.

According to some embodiments of the present disclosure, the specific UL BWP cannot be simultaneously active with the active SL BWP, based on that a numerology of the specific UL BWP is different than a numerology of the active SL BWP.

According to some embodiments of the present disclosure, the UL Priority may be indicated by a Downlink Control Information (DCI), indicating the switching to the specific UL BWP.

For example, it may be determined to switch to the specific UL BWP based on that the DCI indicates high priority for the UL priority.

For example, it may be determined not to switch to the specific UL BWP based on that 1) the DCI indicates low priority for the UL priority, and 2) a value of the SL priority is lower than or equal to a SL threshold.

According to some embodiments of the present disclosure, the UL Priority may be correspond to the highest priority of logical channels having uplink data.

According to some embodiments of the present disclosure, the SL Priority may be correspond to the highest priority of logical channels having sidelink data.

For example, it may be determined to switch to the specific UL BWP based on that a value of the UL priority is lower than or equal to a UL threshold or a value of the SL priority.

For example, it may be determined to switch to the specific UL BWP based on that a value of the SL priority is higher than a SL threshold.

For example, it may be determined not to switch to the specific UL BWP based on that 1) a value of the UL priority is higher than a UL threshold and a value of the SL priority, and 2) the value of the SL priority is lower than or equal to a SL threshold.

According to some embodiments of the present disclosure, the processor 102 may be configured to deactivate the active SL BWP.

For example, the processor 102 may be configured to activate another SL BWP having same numerology with the specific UL BWP, upon deactivating the active SL BWP.

According to some embodiments of the present disclosure, the processor 102 may be configured to be in communication with at least one of a user equipment, a network, or an autonomous vehicle other than the wireless device.

Hereinafter, a processor for a wireless device for handling BWP switching based on priority in a wireless communication system, according to some embodiments of the present disclosure, will be described.

The processor may be configured to control the wireless device to establish a connection with a cell. The processor may be configured to control the wireless device to receive configuration of multiple bandwidth parts (BWPs) on the cell, wherein the multiple BWPs includes at least one active uplink (UL) BWP for UL transmission and at least one active sidelink (SL) BWP for SL transmission. The processor may be configured to control the wireless device to detect a triggering condition for switching to a specific UL BWP which cannot be simultaneously active with the active SL BWP. The processor may be configured to control the wireless device to determine whether to switch to the specific UL BWP based on priority information, wherein the priority information includes at least one of UL priority and/or SL priority. The processor may be configured to control the wireless device to perform the switching to the specific UL BWP based on the determination.

According to some embodiments of the present disclosure, the specific UL BWP cannot be simultaneously active with the active SL BWP, based on that a numerology of the specific UL BWP is different than a numerology of the active SL BWP.

According to some embodiments of the present disclosure, the UL Priority may be indicated by a Downlink Control Information (DCI), indicating the switching to the specific UL BWP.

For example, it may be determined to switch to the specific UL BWP based on that the DCI indicates high priority for the UL priority.

For example, it may be determined not to switch to the specific UL BWP based on that 1) the DCI indicates low priority for the UL priority, and 2) a value of the SL priority is lower than or equal to a SL threshold.

According to some embodiments of the present disclosure, the UL Priority may be correspond to the highest priority of logical channels having uplink data.

According to some embodiments of the present disclosure, the SL Priority may be correspond to the highest priority of logical channels having sidelink data.

For example, it may be determined to switch to the specific UL BWP based on that a value of the UL priority is lower than or equal to a UL threshold or a value of the SL priority.

For example, it may be determined to switch to the specific UL BWP based on that a value of the SL priority is higher than a SL threshold.

For example, it may be determined not to switch to the specific UL BWP based on that 1) a value of the UL priority is higher than a UL threshold and a value of the SL priority, and 2) the value of the SL priority is lower than or equal to a SL threshold.

According to some embodiments of the present disclosure, the processor may be configured to control the wireless device to deactivate the active SL BWP.

For example, the processor may be configured to control the wireless device to activate another SL BWP having same numerology with the specific UL BWP, upon deactivating the active SL BWP.

According to some embodiments of the present disclosure, the processor may be configured to control the wireless device to be in communication with at least one of a user equipment, a network, or an autonomous vehicle other than the wireless device.

Hereinafter, a non-transitory computer-readable medium has stored thereon a plurality of instructions for handling BWP switching based on priority in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a wireless device.

The stored a plurality of instructions may cause the wireless device to establish a connection with a cell. The stored a plurality of instructions may cause the wireless device to receive configuration of multiple bandwidth parts (BWPs) on the cell, wherein the multiple BWPs includes at least one active uplink (UL) BWP for UL transmission and at least one active sidelink (SL) BWP for SL transmission. The stored a plurality of instructions may cause the wireless device to detect a triggering condition for switching to a specific UL BWP which cannot be simultaneously active with the active SL BWP. The stored a plurality of instructions may cause the wireless device to determine whether to switch to the specific UL BWP based on priority information, wherein the priority information includes at least one of UL priority and/or SL priority. The stored a plurality of instructions may cause the wireless device to perform the switching to the specific UL BWP based on the determination.

According to some embodiments of the present disclosure, the specific UL BWP cannot be simultaneously active with the active SL BWP, based on that a numerology of the specific UL BWP is different than a numerology of the active SL BWP.

According to some embodiments of the present disclosure, the UL Priority may be indicated by a Downlink Control Information (DCI), indicating the switching to the specific UL BWP.

For example, it may be determined to switch to the specific UL BWP based on that the DCI indicates high priority for the UL priority.

For example, it may be determined not to switch to the specific UL BWP based on that 1) the DCI indicates low priority for the UL priority, and 2) a value of the SL priority is lower than or equal to a SL threshold.

According to some embodiments of the present disclosure, the UL Priority may be correspond to the highest priority of logical channels having uplink data.

According to some embodiments of the present disclosure, the SL Priority may be correspond to the highest priority of logical channels having sidelink data.

For example, it may be determined to switch to the specific UL BWP based on that a value of the UL priority is lower than or equal to a UL threshold or a value of the SL priority.

For example, it may be determined to switch to the specific UL BWP based on that a value of the SL priority is higher than a SL threshold.

For example, it may be determined not to switch to the specific UL BWP based on that 1) a value of the UL priority is higher than a UL threshold and a value of the SL priority, and 2) the value of the SL priority is lower than or equal to a SL threshold.

According to some embodiments of the present disclosure, the stored a plurality of instructions may cause the wireless device to deactivate the active SL BWP.

For example, The stored a plurality of instructions may cause the wireless device to activate another SL BWP having same numerology with the specific UL BWP, upon deactivating the active SL BWP.

According to some embodiments of the present disclosure, the stored a plurality of instructions may cause the wireless device to be in communication with at least one of a user equipment, a network, or an autonomous vehicle other than the wireless device.

Hereinafter, a method for handling BWP switching based on priority performed by a base station (BS) in a wireless communication system, according to some embodiments of the present disclosure, will be described.

The BS may establish a connection with a wireless device.

The BS may transmit configuration of multiple bandwidth parts (BWPs) on the cell, wherein the multiple BWPs includes at least one active uplink (UL) BWP for UL transmission and at least one active sidelink (SL) BWP for SL transmission.

The BS may receive, from the wireless device, transmission on the active UL BWP.

For example, the BS may transmit, to the wireless device, a Downlink Control Information (DCI) indicating switching to a specific UL BWP. For example, a UL Priority may be indicated by the DCI.

The BS may receive, from the wireless device, transmission on a specific UL BWP based on that the wireless device switches the active UL BWP to the specific UL BWP.

Hereinafter, a base station (BS) for handling BWP switching based on priority in a wireless communication system, according to some embodiments of the present disclosure, will be described.

The BS may include a transceiver, a memory, and a processor operatively coupled to the transceiver and the memory.

The processor may be configured to establish a connection with a wireless device.

The processor may be configured to control the transceiver to transmit configuration of multiple bandwidth parts (BWPs) on the cell, wherein the multiple BWPs includes at least one active uplink (UL) BWP for UL transmission and at least one active sidelink (SL) BWP for SL transmission.

The processor may be configured to control the transceiver to receive, from the wireless device, transmission on the active UL BWP.

For example, the processor may be configured to transmit, to the wireless device, a Downlink Control Information (DCI) indicating switching to a specific UL BWP. For example, a UL Priority may be indicated by the DCI.

The processor may be configured to control the transceiver to receive, from the wireless device, transmission on a specific UL BWP based on that the wireless device switches the active UL BWP to the specific UL BWP.

The present disclosure can have various advantageous effects.

According to some embodiments of the present disclosure described above, a wireless device could handle BWP switching efficiently in a wireless communication system.

For example, a wireless device could perform BWP switching by considering both UL transmission and SL transmissions.

For example, a wireless communication system could provide proper BWP switching based on a priority for a wireless device performing SL transmission.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device in a wireless communication system, the method comprising,
   establishing a connection with a cell;
   receiving configuration of multiple bandwidth parts on the cell,
   wherein the multiple BWPs includes a first active bandwidth part for uplink transmission and a second active bandwidth part for device-to-device direct communication;
   detecting a triggering condition for switching from the first active bandwidth part for uplink transmission to a specific bandwidth part for uplink transmission, wherein the specific bandwidth part for uplink transmission cannot be simultaneously active with the second active bandwidth part for device-to-device direct communication;

based on that 1) a first priority value for uplink transmission is higher than a first threshold value for uplink transmission and a second priority value for device-to-device direct communication, and 2) the second priority value for device-to-device direct communication is lower than or equal to a second threshold for device-to-device direct communication:

determining not to switch from the first active bandwidth part for uplink transmission to the specific bandwidth part for uplink transmission; and skipping the switching from the first active bandwidth part for uplink transmission to the specific bandwidth part for uplink transmission;

based on that 1) a first priority value for uplink transmission is lower than or equal to the first threshold value for uplink transmission and the second priority value for device-to-device direct communication, or 2) the second priority value for device-to-device direct communication is higher than the second threshold for device-to-device direct communication:

determining to switch from the first active bandwidth part for uplink transmission to the specific bandwidth part for uplink transmission; and performing the switching from the first active bandwidth part for uplink transmission to the specific bandwidth part for uplink transmission.

2. The method of claim 1, further comprising:
determining that the specific bandwidth part for uplink transmission cannot be simultaneously active with the second active bandwidth part for device-to-device direct communication, based on that a numerology of the specific bandwidth part for uplink transmission is different from a numerology of the second active bandwidth part for device-to-device direct communication.

3. The method of claim 1, further comprising:
receiving a downlink control information including information related to the switching from the first active bandwidth part for uplink transmission to the specific bandwidth part for uplink transmission,
wherein the downlink control information includes information related to the first priority value for uplink transmission.

4. The method of claim 1, further comprising:
based on that 1) a first priority value for uplink transmission is lower than or equal to the first threshold value for uplink transmission and the second priority value for device-to-device direct communication, or 2) the second priority value for device-to-device direct communication is higher than the second threshold for device-to-device direct communication
deactivating the second active bandwidth part for device-to-device direct communication.

5. The method of claim 4, further comprising:
based on that 1) a first priority value for uplink transmission is lower than or equal to the first threshold value for uplink transmission and the second priority value for device-to-device direct communication, or 2) the second priority value for device-to-device direct communication is higher than the second threshold for device-to-device direct communication:

activating a third active bandwidth part for device-to-device direct communication having same numerology with the specific bandwidth part for uplink transmission.

6. The method of claim 1, wherein the wireless device is in communication with at least one of a user equipment, a network, or an autonomous vehicle other than the wireless device.

7. A wireless device in a wireless communication system comprising:
a transceiver;
a memory; and
at least one processor operatively coupled to the transceiver and the memory, and configured to:
establish a connection with a cell;
receive configuration of multiple bandwidth parts on the cell,
wherein the multiple BWPs includes a first active bandwidth part for uplink transmission and a second active bandwidth part for device-to-device direct communication;
detect a triggering condition for switching from the first active bandwidth part for uplink transmission to a specific bandwidth part for uplink transmission,
wherein the specific bandwidth part for uplink transmission cannot be simultaneously active with the second active bandwidth part for device-to-device direct communication;
based on that 1) a first priority value for uplink transmission is higher than a first threshold value for uplink transmission and a second priority value for device-to-device direct communication, and 2) the second priority value for device-to-device direct communication is lower than or equal to a second threshold for device-to-device direct communication:

determine not to switch from the first active bandwidth part for uplink transmission to the specific bandwidth part for uplink transmission; and skip the switching from the first active bandwidth part for uplink transmission to the specific bandwidth part for uplink transmission;

based on that 1) a first priority value for uplink transmission is lower than or equal to the first threshold value for uplink transmission and the second priority value for device-to-device direct communication, or 2) the second priority value for device-to-device direct communication is higher than the second threshold for device-to-device direct communication:

determine to switch from the first active bandwidth part for uplink transmission to the specific bandwidth part for uplink transmission; and perform the switching from the first active bandwidth part for uplink transmission to the specific bandwidth part for uplink transmission.

8. The wireless device of claim 7, wherein the specific UL BWP cannot be simultaneously active with the active SL BWP, based on that a numerology of the specific UL BWP is different than a numerology of the active SL BWP.

9. A non-transitory computer-readable medium having stored thereon a plurality of instructions, which, when executed by a processor of a wireless device, cause the wireless device to:
establish a connection with a cell;
receive configuration of multiple bandwidth parts on the cell, wherein the multiple BWPs includes a first active bandwidth part for uplink transmission and a second active bandwidth part for device-to-device direct communication;

detect a triggering condition for switching from the first active bandwidth part for uplink transmission to a specific bandwidth part for uplink transmission, wherein the specific bandwidth part for uplink transmission cannot be simultaneously active with the second active bandwidth part for device-to-device direct communication;

based on that 1) a first priority value for uplink transmission is higher than a first threshold value for uplink transmission and a second priority value for device-to-device direct communication, and 2) the second priority value for device-to-device direct communication is lower than or equal to a second threshold for device-to-device direct communication:

determine not to switch from the first active bandwidth part for uplink transmission to the specific bandwidth part for uplink transmission; and skip the switching from the first active bandwidth part for uplink transmission to the specific bandwidth part for uplink transmission;

based on that 1) a first priority value for uplink transmission is lower than or equal to the first threshold value for uplink transmission and the second priority value for device-to-device direct communication, or 2) the second priority value for device-to-device direct communication is higher than the second threshold for device-to-device direct communication:

determine to switch from the first active bandwidth part for uplink transmission to the specific bandwidth part for uplink transmission; and perform the switching from the first active bandwidth part for uplink transmission to the specific bandwidth part for uplink transmission.

* * * * *